UNITED STATES PATENT OFFICE 2,115,316

MOLDABLE CASEIN COMPOSITION

William S. Murray, Utica, N. Y., assignor to Dairymen's League Co-Operative Association, Inc., New York, N. Y., a corporation of New York No Drawing. Application November 7, 1933, Serial No. 696,987. Renewed June 24, 1937

13 Claims. (Cl. 106—38)

This invention relates to a composition of matter and method of making said composition, and more particularly to a casein plastic in which other constituents of milk are utilized to produce the plastic, so that the expensive preliminary purification of the casein heretofore regarded as necessary may be eliminated.

It is the object of my present invention to provide a molding plastic in powdered form, which is capable of use in standard molding equipment intended for molding of other powdered plastic materials and which becomes indurated and insoluble upon molding, without subsequent treatment.

Molded casein products have already found numerous practical uses; but although the properties of casein make it well suited for numerous other uses, the high cost of its preparation and hardening have prevented the wide application which otherwise it would certainly have enjoyed.

These difficulties are eliminated by my present invention, and a casein plastic may be made at a cost so much lower that it can compete on a favorable basis with all other quality molding materials.

It had not heretofore been considered possible to manufacture a casein plastic from milk, or milk powder, containing soluble ingredients such as lactose, because of the effect of these soluble materials in rendering the final product unstable in the presence of water or moisture. Consequently, it has been the practice to purify the casein at considerable expense before using it in the manufacture of plastics. I have now discovered that it is entirely practicable to convert most of these soluble ingredients of the milk into an insoluble precipitate which when washed, dried and ground produces a plastic composition. Thus I have found, in particular, that if the milk, including substantially all of the solids normally present therein (by which I do not intend to include the fat content, since this is preferably removed for other purposes), is treated at an elevated temperature, and with a weak organic acid, as for example, stearic acid and abietic acid, and a tanning agent, e. g., chrome alum, and a mild alkaline agent, e. g., an alkaline silicate, most of the soluble constituents of the milk will be converted into a desirable insoluble product, and that if the resulting material is washed, dried and ground, an extremely satisfactory powdered molding material will result, which, upon molding under pressure and at a relatively high temperature for a short time, will produce a hard, stable, insoluble, molded article comparing favorably with the best molded casein products, and molded resinous products.

The composition as used in practice advantageously includes, in addition to the products derived from the milk, fillers, pigments, etc., such as wood flour, colors, and such other ingredients, including, for example, plasticizers, softeners, perfumes, etc., as may serve to give desired properties such as opacity, color, odor, etc., or merely to dilute and cheapen the product.

Although the chemistry of this process and of its products is not as yet fully investigated, it appears that the initial treatment of the constituents of the fat-free milk results first in the precipitation of the casein by the mild acid and heat, and then in the hydrolysis of the lactose into aldoses or other aldehydic products which I believe, react with the proteins of the casein in well known manner to form more or less insoluble products therewith. The presence of the stearic, abietic, or other acids apparently serves to promote the hydrolysis and/or reaction of the decomposition products of the sugar with the proteins. I have found that it is extremely desirable to use for this purpose substantially insoluble acids such as the higher fatty acids, resin acids, etc., because of the fact that these acids, instead of impairing the stability of the final product in the presence of water, as would any unreacted soluble acid, in so far as they remain in the final product, serve to improve its properties, acting as a resin or a wax in the plastic composition. Thus, in particular, stearic acid improves substantially the molding properties, and permits the removal of the molded article more readily from the mold.

The alkali silicate, ordinarily sodium silicate, apparently serves a dual function in this composition. In the first place, its mildly alkaline nature apparently plays a significant part in the reaction, and in the second place, the release of silicic acid in the presence of the fatty and/or resin acid and/or the stronger tanning agent, provides an additional mineral tanning agent which apparently assists both in rendering the product more insoluble, and in improving its strength and hardness.

In one embodiment, my invention may be practiced as follows:

| | Parts by weight |
|---|---|
| Skimmed milk | 3200 |
| Wood flour | 270 |
| Rosin powder | 60 |
| Stearic acid | 12 |
| Sodium silicate, 40% solution | 180 |
| Chrome alum | 70 |

Instead of skimmed milk, as above, dried milk may be used by diluting with a suitable amount of water,—for example, 270 parts of dried skimmed milk could be mixed with 2930 parts of water, or, similarly, evaporated milk could be used, preferably after suitable dilution.

The mixture as above specified may be put into an autoclave and held there, preferably with constant stirring, for five or six hours, at a temperature of about 100° to 120° C.

After this preliminary treatment, the material may be discharged from the autoclave into a suitable press. It is first washed with water and then the water is extracted from the precipitated material, e. g., by mechanical pressure. This may be done, for example, by putting the resulting material into a sack of filter cloth, washing and pressing it in a suitable filter press, after which the material may be dried at preferably a temperature not exceeding 110° C.

A steam jacketed rotary drum drier may be used for this purpose if the temperature is carefully controlled and local overheating carefully avoided; but I have found that drying may be effected more rapidly and less caution is required if a steam tube drier is used. Such a drier ordinarily consists of a steam jacketed trough in which a steam coil rotates so as to keep the material stirred up and moving over the heating surfaces.

After the material has been thoroughly dried, e. g., down to a water content of about 2% to 5%, it may be ground, e. g., in a high speed hammer mill type grinder. The mill may have a steel grating with $\frac{1}{16}$" round holes, so that the material, when satisfactorily ground, may escape from the grinder. The ground material, after being discharged from the grinder in this way, may be collected in an ordinary dust collector, after which it is ready for molding, without any further treatment.

Other materials than those specified above may be used in the composition in addition to, or wholly or in part to replace some of the constituents specified. In most cases, I prefer, however, in so far as it is possible, to add all such additional ingredients to the composition before drying, since the addition of fillers, pigments, etc., to the dried powder may impair the molding qualities of the composition.

The molding of this composition may be performed in the usual press molds adapted for molding of powdered plastics. I prefer to effect this molding at a temperature above 135° C., e. g., 150° C. to 200° C., these temperatures being specified for best results, and not intended as limits of possible operation. Operating within this temperature range, the molding is best effected under pressure of approximately 3500 to 4000 pounds per square inch, maintained for from three to five minutes, where the article has a thickness of about $\frac{1}{16}$ of an inch.

The present material is either allowed to cool to below about 80° C. under continued pressure before removing from the mold, or the die may be transferred from the hot press to a cold press, approximately the same pressure being immediately applied thereto, to be maintained until the article is cooled below about 80° C., after which it may be removed from the die.

While the example given above is entirely satisfactory for uses where the composition is not subjected to severe exposure to weather, alkaline solutions, etc., and in such uses is preferable because of the lesser expense of rosin, I have found it desirable, for the manufacture of knife handles and other articles which are likely to be subjected to soaking, etc., to use a resin more resistant to hydrolyzing than ordinary rosin.

The following may be given as an example of a composition particularly adapted for the manufacture of knife handles and other articles which are subjected to similar severe usage:

| | Parts by weight |
|---|---|
| Wood flour | 50.25 |
| Milk powder | 40 |
| An oil soluble dye, e. g. nigrosein treated with stearic acid | 4 |
| Butyl stearate | .75 |
| Powdered orange shellac | 5 |
| Water | 700 | are placed in a digester, in the order named. The digester is preferably steam-jacketed, and may be either hot or cold when the ingredients are charged therein. Before the steam is turned into the jacket, or heating otherwise actively initiated, the ingredients are stirred within the digester, e. g., by paddles rotating at 800 to 900 R. P. M. The heating is then begun and the temperature raised so as to produce a pressure of about 15 pounds gauge within the digester.

The particular order of adding the materials to the digester is specified because it has been found that unless gum is added at the top of the mass, there is a tendency for it to segregate at the bottom, and since the resin acids are almost insoluble in water, it is important that the gum resin should be intimately mixed with the milk powder.

The wood flour given in the above formula serves, as in the first example given, merely as a filler, and may be replaced by other suitable fillers. Butyl stearate is used in the above formula as the mold lubricant instead of stearic acid, and in this type of composition, gives substantially better results than stearic acid.

The mixture is heated for one to two hours, and when the digester is opened, it will be found that the mass of molding material has precipitated in the digester. The precipitate is then pressed on a filter, e. g., so that the moisture is reduced to about 60% to 65%, after which it is dried in a steam tube drier, using about 10 pounds steam pressure, e. g., for one and one-half hours. The dried material is then ground and screened to a size suitable for molding, and packaged in moisture-proof packages. It is important to keep the product free from excess moisture until it is molded.

The product obtained as just described may be molded in substantially the same way as described in connection with the first example given, e. g., in closed molds at 190° C., and 4000 pounds per square inch pressure.

It is an important advantage in my invention that the aldehyde which is used to harden the casein is produced in situ within the mass, so that every particle of the casein is intimately exposed to the action of the aldehyde. This is a condition which it is substantially impossible to attain where the casein is hardened with aldehyde while in massive form.

Although I have given above, for the purpose of illustrating my invention, two specific examples thereof, it is to be understood that numerous changes and modifications may be made therein without departing from the scope of my invention. Thus, for example, other ingredients may be added to condense with aldehydic derivatives of the soluble sugars with the formation of resinous products instead of reacting these derivatives directly with the casein or other constituents of the milk. Other equivalents may be used instead of those mentioned, various changes in the procedure may be made, and some of the initial reactions may be carried out without the presence of materials which become important at the later stages of the process. So far as I have found, however, the above represents the most economical and satisfactory method of procedure, and produces an extremely desirable product.

What I claim is:

1. The method of converting the solids of milk into a plastic which comprises mixing said solids, including casein and lactose, with a weak acid of about the dissociation value of resin acids, a tanning agent, and an alkaline material adapted to neutralize the tanning agent, treating the mixture in the presence of water at a temperature between about 100° C. and 120° C. with agitation, and drying the resulting product.

2. A method of forming massive products from milk which comprises treating the solids of the milk to hydrolyze the soluble sugar thereof, reacting a product of such hydrolysis with the casein of the milk to form an insoluble product, and hardening the casein.

3. The method as defined in claim 2, in which the conversion of the sugar comprises hydrolysis in the presence of relatively insoluble acid and of the other solid constituents of the milk.

4. The method as defined in claim 2, in which the conversion of sugar comprises a treatment in the presence of water with an acid of approximately the dissociation value of resin acids.

5. The method as defined in claim 2, in which the conversion of sugar comprises treatment in aqueous solution at elevated temperature in the presence of stearic and abietic acid and a mild base.

6. The method of forming a casein plastic from the solid constituents of milk which comprises decomposing the lactose of the milk to form aldehydic derivatives, and reacting said aldehydic derivatives with the casein.

7. The method of making a massive product from milk, which comprises treating the solids of skim milk in water with shellac at a temperature of the order of 120° C. for approximately one to two hours, separating the precipitated solids from the water and heating said solids under pressure to a temperature from 150° to 190° C.

8. The method of making a massive product which comprises adding to a digester, in the order named, approximately 50 parts of wood flour, 40 parts of milk powder, 4 parts of oil soluble dye, 0.75 part of butyl stearate, 5 parts of orange shellac, and 700 parts of water, stirring the mixture, heating for approximately 1 to 2 hours at approximately 15 pounds gauge pressure in the digester, pressing the precipitate on a filter, drying the filter cake, grinding the dried mass, pressing at approximately 4000 pounds per square inch pressure and approximately 190° C., and cooling the compressed product before relieving the pressure.

9. A plastic composition comprising insoluble reaction products of casein with the product of hydrolysis of lactose.

10. A composition of matter comprising the product of a reaction of an aqueous mixture of lactose, casein, abietic acid, stearic acid, alkali silicate, and a chrome tanning agent.

11. A composition of matter comprising a reaction product of casein and of aldehydic decomposition products of lactose.

12. A molding powder comprising substantially the entire solids of skim milk consisting primarily of casein and having the soluble portions thereof chemically converted into insoluble products.

13. A reaction product of the casein and sugar constituents of skim milk and a substantially water-insoluble weak acid.

WILLIAM S. MURRAY.